(12) United States Patent
Li

(10) Patent No.: US 8,446,894 B2
(45) Date of Patent: May 21, 2013

(54) SYSTEMS AND METHODS FOR PERFORMING INITIAL SYNCHRONIZATION IN WIRELESS COMMUNICATIONS SYSTEMS

(75) Inventor: Xuan Li, Ocean, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 625 days.

(21) Appl. No.: 12/250,012

(22) Filed: Oct. 13, 2008

(65) Prior Publication Data

US 2010/0040043 A1 Feb. 18, 2010

(30) Foreign Application Priority Data

Aug. 12, 2008 (CN) .......................... 2008 1 0146248

(51) Int. Cl.
*H04J 3/06* (2006.01)
(52) U.S. Cl.
USPC .......................................................... 370/350
(58) Field of Classification Search
None
See application file for complete search history.

(56) References Cited

U.S. PATENT DOCUMENTS

| | | | | |
|---|---|---|---|---|
| 7,769,119 | B2* | 8/2010 | Chun et al. | 370/208 |
| 7,809,097 | B2* | 10/2010 | Wang et al. | 375/355 |
| 2005/0163262 | A1 | 7/2005 | Gupta | |
| 2006/0171493 | A1* | 8/2006 | Kim et al. | 375/343 |
| 2007/0280098 | A1* | 12/2007 | Bhatt et al. | 370/208 |
| 2009/0213947 | A1* | 8/2009 | Rao et al. | 375/260 |

OTHER PUBLICATIONS

T. M. Schmidl and D. C. Cox, "Robust frequency and timing synchronization for OFDM," IEEE Transaction on Communications, vol. 45, No. 12, pp. 1613-1621, Dec. 1997.
IEEE Standard 802.16 (2005).
J-J. Van De Beek, M. Sandell, and P. O. Borjesson, "ML estimation of time and frequency offset in OFDM sytems," IEEE Transaction on Signal Processing, vol. 45, No. 7, pp. 1800-1805, Jul. 1997.

* cited by examiner

*Primary Examiner* — Anh-Vu Ly
(74) *Attorney, Agent, or Firm* — Pillsbury Winthrop Shaw Pittman LLP

(57) ABSTRACT

A method is described for performing frame synchronization that comprises performing a first synchronization to determine approximate timing of a frame boundary associated with a received signal. The method further comprises estimating frequency offset and symbol boundaries within the frame boundary based on the approximate timing and performing a second synchronization based on the frame boundary and the symbol boundary.

22 Claims, 7 Drawing Sheets

SYSTEMS AND METHODS FOR PERFORMING INITIAL SYNCHRONIZATION IN WIRELESS COMMUNICATIONS SYSTEMS

CROSS-REFERENCE TO RELATED APPLICATION

This application claims priority to, and the benefit of, Chinese Application No. 200810146248.3, filed on Aug. 12, 2008, which is incorporated by reference in its entirety.

TECHNICAL FIELD

The present disclosure generally relates to wireless communications, and more particularly, to performing initial synchronization in wireless communications systems.

BACKGROUND

When a new subscriber unit attempts to access a wireless communication network, the subscriber unit determines the frame/symbol boundary of the downlink transmission, compensates for frequency offset, and identifies the base station ID (i.e., the cell ID). This process is generally referred to as initial synchronization. As those skilled in the art will appreciate, the initial synchronization of Mobile WiMAX (Worldwide Interoperability for Microwave Access) signals based on the IEEE 802.16e standard poses challenges different than those observed in other orthogonal frequency-division multiplexing (OFDM) systems such as wireless local area networks (WLANs) and digital video broadcasting (DVB) systems.

Some of the challenges may include low operating signal-to-noise ratios (SNRs), non-ideally repetitive structure in the preamble, multipath contaminated cyclic prefix, a large number of possible cell IDs, and potentially large frequency offsets. Generally, a low SNR affects the reliability of energy gap detection, and a non-ideally repetitive structure in the preamble causes great performance loss in auto-correlation detection. Furthermore, multipath contaminated cyclic prefix reduce the effectiveness of cyclic prefix based detection, and the large frequency offsets coupled with the number of cell IDs creates a significant computational burden for cross-correlation.

Those skilled in the art will appreciate that there is a need for optimized systems and methods for initial synchronization in a communications medium, such as, but not limited to, a wireless network whereby computational resources are efficiently utilized. The wireless network may conform, for example, to the Mobile WiMAX (IEEE 802.16e) standard.

SUMMARY

Briefly described, one embodiment, among others, includes a method for performing frame synchronization. The method comprises performing a first synchronization to determine approximate timing of a frame boundary associated with a received signal. The method further comprises estimating frequency offset and symbol boundaries within the frame boundary based on the approximate timing and performing a second synchronization based on the frame boundary and the symbol boundary.

Another embodiment includes an apparatus for performing initial synchronization. The apparatus comprises a first synchronizer configured to determine approximate timing of a frame boundary for a received signal, a frequency offset estimator configured to estimate a frequency offset associated with symbol boundaries within the received signal, and a second synchronizer configured to determine precise timing information of the received signal.

Yet another embodiment includes a system for performing frame synchronization. The system comprises means for performing a first-pass synchronization to determine approximate timing of a frame boundary associated with a received signal, means for estimating frequency offset and symbol boundaries within the frame boundary based on the approximate timing, and means for performing a second-pass synchronization based on the frame boundary and the symbol boundary.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
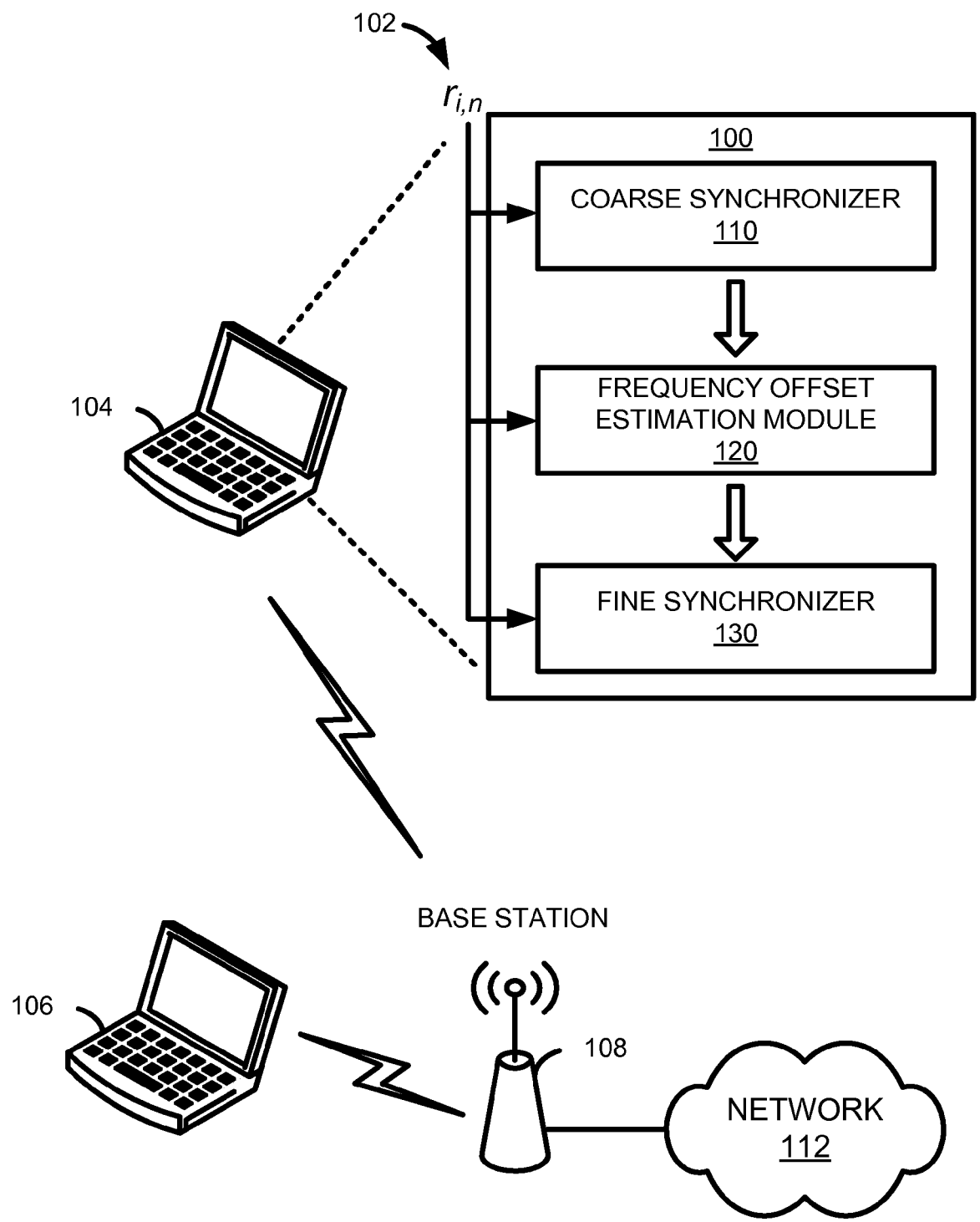
FIG. 1 is a top level diagram of an initial synchronization apparatus.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Conventional approaches to initial synchronization methods in OFDM systems include energy gap detection, auto-correlation, cyclic prefix (CP) detection, and cross-correlation. Energy gap detection is commonly used in TDD (time-division duplex) systems to determine TDD timing by detecting the energy variety during transmit and receive transitions. The advantage of this method is that the method relies only on the energy envelope of the receiving signal and therefore does not require any pre-known signal such as a preamble.

One perceived shortcoming with this approach, however, is that the subscriber unit must be able to perform synchronization at SNR as low as 0 dB. Environments with a low SNR present a challenge as there is virtually no energy gap due to merging of the downlink signal with the noise floor. Even in cases where the SNR is high, there is still a high probability that the subscriber unit may detect an erroneous energy transition edge if other subscriber units transmitting strong uplink signals are in close proximity.

Another conventional approach to initial synchronization involves auto-correlation, which requires a specific frame structure that contains two or more identical segments. The subscriber unit determines frame timing by searching for such repetitive patterns in the received signal. One advantage of this method is that the method relies only on the repetitive patterns without the need to know the exact code information in the pattern. Also, auto-correlation peaks are not sensitive to frequency offsets. Such repetitive pattern designs are applied to WiFi (IEEE 802.11) where the design may be used as a synchronization preamble.

One perceived shortcoming, however, is that preamble designs involving auto-correlation are not practical for application in IEEE 802.16e systems due to the following reasons. First, at the location of a sector or cell boundary where a subscriber unit is likely to receive preambles at all three segments with comparable strength, there is no repetitive structure contained in the preamble. As such, auto-correlation will no longer work in such scenarios. Furthermore, even in cases where a subscriber unit receives a preamble signal on only one-third of the subcarriers (for example, where the subscriber unit is located at the center of a sector), the preamble still does not contain three identical segments due to the fact that three is not an integer factor of subcarrier number (1,024 for a 10 MHz profile, for example). The three segments are actually offset by a fraction of one sample duration, resulting in significant peak loss and degraded timing detection performance.

Cyclic prefix (CP) detection, which utilizes the inherent repetitive structure associated with the CP in OFDM symbols, is another conventional approach to performing initial synchronization. As with the other conventional methods discussed above, however, there are various perceived shortcomings with this approach, including vulnerability to ISI (inter-symbol interference). As such, the performance of CP-based timing acquisition is generally poor in multipath environments. Furthermore, CP-based schemes can only detect the OFDM symbol boundary and require additional mechanisms to derive the frame boundary based on the symbol timing. This may increase the complexity in implementation.

The use of cross-correlation is yet another conventional method for detecting timing in many communication systems. Typically, a preamble reference is stored locally and used to cross correlate with the receiving signal. Due to the high spreading gain associated with the preamble sequence, timing detection is generally immune to both noise and multipath impairments. However, this scheme is relatively complex and resource intensive as an expensive matched filter bank is usually required to process many local preamble codes. (For example, there are 114 different preamble codes defined in the IEEE 802.16e standard). In addition, the cross-correlation peak will be very sensitive to the frequency offset between the base station and the subscriber unit, which will inevitably increase the degree of difficulty and complexity involving detection.

Various embodiments are described that overcome the perceived shortcomings of conventional approaches discussed above. Furthermore, the implementation of such embodiments is relatively low in complexity and yields excellent performance in both Additive White Gaussian Noise (AWGN) and fading channels. Although described in the context of WiMAX standard (IEEE 802.16e), it should be noted that the disclosure is not limited to WiMAX systems, and other applications where initial synchronization is employed may similarly fall within the scope of the embodiments of the systems and methods described herein.

Reference is made to FIG. 1, which is a top level diagram of an initial synchronization apparatus. The initial synchronization apparatus 100 may be configured to operate in a wireless environment. FIG. 1 illustrates a typical network configuration for communicating data between clients 104, 106 via a base station 108. As illustrated in the non-limiting example of FIG. 1, a network 112 may be coupled to the base station 108. In some embodiments, the network 112 may be the Internet, for example. The base station 108 may be configured to provide wireless communications to various wireless clients 104, 106. Depending on the particular configuration, the clients 104, 106 may be a personal computer, a laptop computer, a mobile phone, and/or other device configured for wirelessly sending and/or receiving data. Furthermore, the base station 108 may be configured to provide Wi-Fi services, WiMAX services, wireless SIP services and/or other wireless communication services. The clients 104, 106 may comprise an initial synchronization apparatus 100.

The initial synchronization apparatus 100 comprises various modules or components 110, 120, 130. For purposes of this disclosure, a received frame 102 in the time domain is denoted as $\{r_{i,n}\}$, where $r_{i,n}$ denotes the $i^{th}$ received sample in the $n^{th}$ frame. The initial synchronization apparatus 100 comprises a coarse synchronizer 110, which is configured to perform inter-frame auto-correlation and multiple frame combination. According to the IEEE 802.16e standard, a preamble symbol is periodically broadcast at the beginning of each downlink sub-frame. Thus, for various embodiments, auto-correlation of preambles in adjacent frames may be performed to generate correlation peaks, which may then be used to identify the frame boundary. Furthermore, multiple auto-correlation results are combined to improve the reliability of detection.

The initial synchronization apparatus 100 further comprises a second module 120, which is configured to estimate a frequency offset associated with the received signal. Once approximate frame timing is obtained using the coarse synchronizer 110, CP-based auto-correlation of symbols around the preamble is performed to estimate symbol boundary and a fractional frequency offset. Any timing error and fractional frequency error that is detected is compensated for, and the preamble index of the serving cell (i.e., the Cell ID) and integer frequency offset can be readily detected by utilizing a preamble code detection algorithm.

The initial synchronization apparatus 100 further comprises a third module 130 configured to perform fine synchronization. The module 130 determines the time domain channel impulse response (CIR) based on the frequency domain preamble symbol of the received signal. The determination of frame and symbol boundaries is further refined to meet demodulation requirements regarding timing precision by tracking the first path of the CIR. In this regard "fine" synchronization is achieved.

Figure 2A:
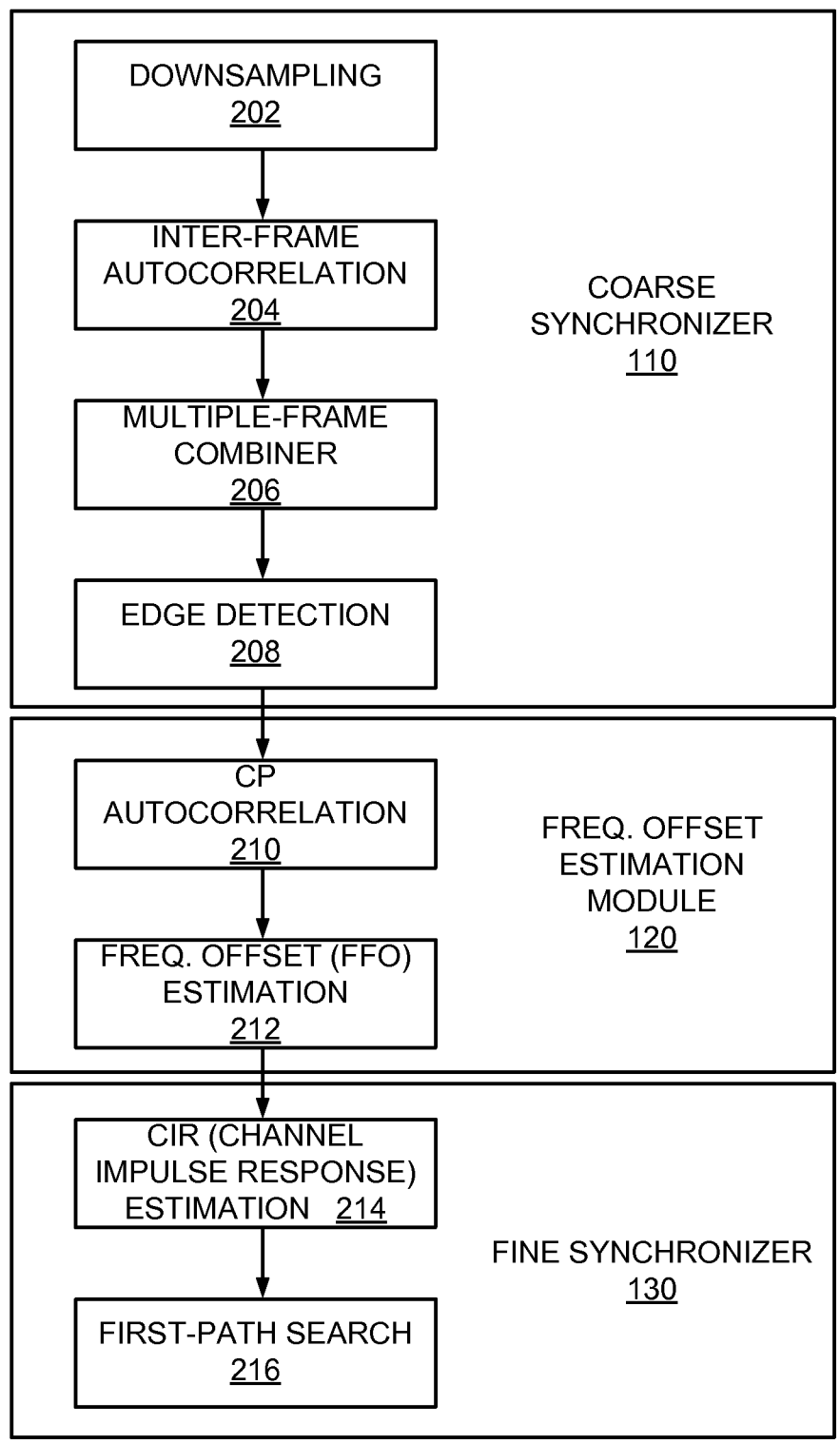
FIG. 2A illustrates various components of the initial synchronization apparatus depicted in FIG. 1.

Having described a top level diagram of an initial synchronization apparatus, reference is now made to FIG. 2A-D, which provides a more detailed view of the various modules shown in FIG. 1. As shown in FIG. 2A, the coarse synchronizer 110 shown in FIG. 1 may further comprise a downsampling module 202, a module 204 for performing inter-frame auto-correlation, a module 206 for combining multiple frame auto-correlation results, and an edge detection module 208. In accordance with such embodiments, the downsampling module 202 performs downsampling of the received frames in order to reduce overall complexity of the auto-correlation function that follows. In particular, by employing downsampled inter-frame auto-correlation instead of conventional cross-correlation, the degree of complexity involved in initial synchronization is vastly reduced.

As discussed earlier, the received frame in the time domain is denoted as $\{r_{i,n}\}$, where $r_{i,n}$ denotes the $i^{th}$ received sample in the $n^{th}$ frame. The downsampling operation performed by module 202 may be expressed as:

$$z_{k,n} = r_{i,n}|_{i=D_s \cdot k}; \, k=0,1,\ldots,K-1; \, K=\lceil N/D_s \rceil \quad \text{(Eq. 1)}$$

where $z_{k,n}$ is the $k^{th}$ sample in the $n^{th}$ downsampled frame, and N, K represent the sample number of one frame before and after downsampling respectively. $D_s$ represents the downsampling rate, which is an integer with a value greater than or equal to 1. The expression $\lceil a \rceil$ represents the minimum integer larger than a.

Module 204 is configured to perform inter-frame auto-correlation between the $n^{th}$ frame and the $(n+1)^{th}$ frame. By utilizing inter-frame auto-correlation instead of preamble-based auto-correlation, problems caused by the non-ideally repetitive structure of the preamble and performance loss in cell boundary are avoided. In accordance with some embodiments, the auto-correlation function can be expressed as:

$$C_{l,n} = \sum_{k=0}^{L_w-1} z^*_{k+l \cdot L_s, n} \cdot z_{k+l \cdot L_s, n+1} \quad \text{(Eq. 2)}$$

$$l = 0, 1, \ldots, L-1; \, L = \lceil K/L_s \rceil$$

where $C_{l,n}$ is the $l^{th}$ correlation value of the $n^{th}$ frame, $L_w$, $L_s$, and L denote the length of the correlation window, the step size between adjacent windows, and the total number of correlation windows in one frame, respectively. As a non-limiting example, $L_w$ may be set to a value 1½ times the length of the downsampled symbol, and $L_s$ may be set to the length of downsampled symbol. The module 204 then normalizes the auto-correlation values. The purpose of normalization is to suppress potential strong uplink interference from nearby subscriber units, and therefore improve detection performance in multi-user environments. In accordance with some embodiments, module 204 normalizes the auto-correlation values based on the following:

$$C^{norm}_{l,n} = \frac{2 \cdot |C_{l,n}|}{E_{l,n} + E_{l,n+1}} \quad \text{(Eq. 3)}$$

where $E_{l,n}$ is the energy of the $l^{th}$ correlation window in the $n^{th}$ frame as defined as:

$$E_{l,n} = \sum_{k=0}^{L_w-1} |z_{k+l \cdot L_s, n}|^2 \quad \text{(Eq. 4)}$$

It should be emphasized that one of ordinary skill in the art will appreciate that other normalization methods may be used without departing substantially from the concepts set forth in this disclosure. As a non-limiting example, a product rather than a sum may be utilized in the denominator of Equation 3 while yielding similar results.

The module 206 for combining multiple frame auto-correlation results is configured to determine the sum for each auto-correlation sequence, as expressed by:

$$C_l = \sum_{m=0}^{M-1} C^{norm}_{l,m} \quad \text{(Eq. 5)}$$

where M represents the number of accumulated frames. Generally, one-shot correlation is not reliable enough for synchronization purposes, particularly when a fading channel is involved. As such, the coarse synchronizer 110 utilizes module 206 to improve detection performance by determining an average among the auto-correlation sequences across multiple frames, as shown in Equation 5 above. For some embodiments, a moving average or one-order filter may be used over multiple frames to smooth the fluctuations in the outcomes.

The edge detection module 208 is utilized by the coarse synchronizer 110 to address "fake" peaks caused by relatively high auto-correlation peaks associated with such signaling symbols as DL_MAP (defined under IEEE 802.16e), which may remain unchanged across many frames. To address these fake peaks, the edge detection module 208 performs edge detection based on the combined sequence as follows:

$$d_i = \frac{1}{L_f} \sum_{l=i}^{i+L_f-1} C_{l \, modL} - \frac{1}{L_b} \sum_{l=i-L_b}^{i-1} C_{l \, modL} \quad \text{(Eq. 6)}$$

$$i = 0, 1, \ldots, L-1$$

where $L_f$ and $L_b$ represent the average values in the forward and backward directions, respectively. As shown in Equation 6, edge detection involves first averaging the former $L_b$ correlation values and latter $L_f$ values and then calculates the difference of the average results. The total value $(L_f+L_b)$ should be less than L. As a non-limiting example, the values for $L_f$ and $L_b$ may be set to $L_f=1$ and $L_b=10$. Coarse timing $T_c$ may then be derived by determining the position of the maximum peak in the correlation sequence, such that:

$$T_c = L_s \cdot D_s \cdot \arg\max_i (d_i) \quad \text{(Eq. 7)}$$

Figure 2B:
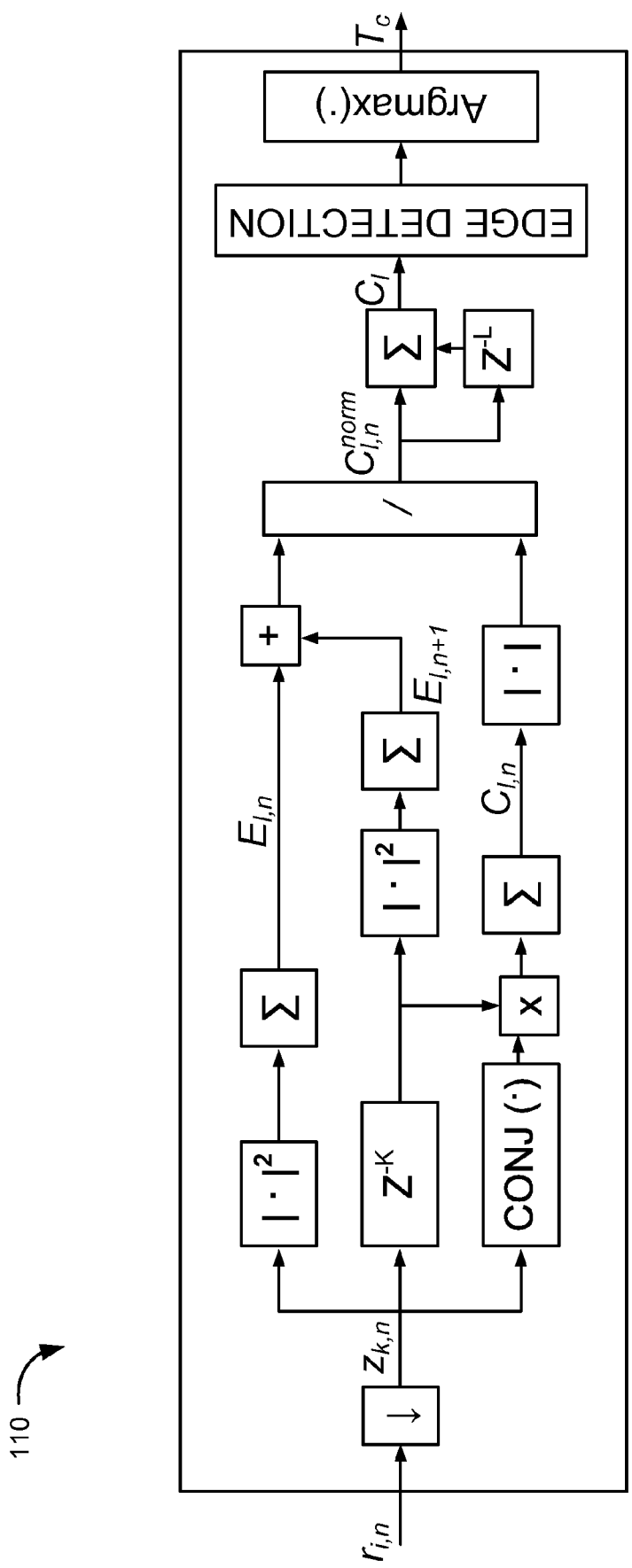
FIG. 2B illustrates an embodiment of the coarse synchronization module depicted in FIG. 2A.

FIG. 2B illustrates an embodiment of the coarse synchronizer 110 described above based on the various functions described in relation to the components within the coarse synchronizer 110.

The frequency offset estimation module 120 may comprise a CP (cyclic prefix) auto-correlation module 210 and a frequency offset (FFO) estimation module 212. Once coarse timing is derived by the coarse synchronizer 110, the CP auto-correlation module 210 in the frequency offset estimation 120 performs CP auto-correlation on the original received signal (i.e., the original signal prior to undergoing downsampling). The range across which CP auto-correlation is performed is denoted herein by $[n_1, n_2]$ and should include the coarse timing position and should span at least one OFDM symbol. For embodiments where a plurality of OFDM symbol is used for CP auto-correlation, a combination of CP correlation results over multiple symbols can be employed to further improve the frequency offset detection reliability. The CP auto-correlation performed by module 210 may be expressed as:

$$C_i^{cp} = \sum_{j=0}^{N_{CP}-1} r_{i+j}^* \cdot r_{i+j+N_{fft}} \qquad (\text{Eq. 8})$$

$$i = n_1, n_1 + 1, \ldots, n_2$$

where $N_{fft}$ represents the size of the fast Fourier transform (FFT) and $N_{cp}$ represents the length of CP. As described earlier for the inter-frame correlation module 204, normalization is performed by the CP auto-correlation module 210. In accordance with some embodiments, The CP auto-correlation is normalized based on the following:

$$C_i^{cp,norm} = \frac{2 \cdot |C_i^{cp}|}{E_{1,i}^{cp} + E_{2,i}^{cp}} \qquad (\text{Eq. 9})$$

where $E_{1,i}^{cp}$ and $E_{2,i}^{cp}$ represent the energy of CP and its identical part in the OFDM symbol. The energy may be expressed as follows:

$$E_{1,i}^{cp} = \sum_{j=0}^{N_{cp}-1} |r_{i+j}|^2 \qquad (\text{Eq. 10})$$

$$E_{2,i}^{cp} = \sum_{j=0}^{N_{cp}-1} |r_{i+j+N_{fft}}|^2 \qquad (\text{Eq. 11})$$

As a non-limiting example, a product rather than a sum may be utilized in the denominator of Equation 9 while yielding similar results. Based on the normalized correlation results, significant correlation peaks caused by uplink interference can be identified and removed (i.e., interference nulling). In particular, the correlation values are set to zero based on the following:

$$C_i^{cp} = 0, i \in \{i | C_i^{cp,norm} < Th_{cp}\} \qquad (\text{Eq. 12})$$

It should be noted that the threshold $Th_{cp}$ above can either be a predetermined constant or an adaptive value. For embodiments where the threshold $Th_{cp}$ is set to an adaptive value, the value may be derived according to:

$$Th_{cp} = F_{cp} \cdot \max_i (C_i^{cp,norm}) \qquad (\text{Eq. 13})$$

where $F_{cp}$ is a constant less than or equal to 1. As a non-limiting example, the constant $F_{cp}$ may be set to 0.5. Symbol timing $T_{cp}$ may then be derived by identifying the maximum value from among the various correlation values $C^{cp}$.

$$T_{cp} \leftarrow \arg\max_i (C_i^{cp}) \qquad (\text{Eq. 14})$$

The frequency offset estimation module 120 further comprises a fractional frequency offset (FFO) estimation module 212 configured to determine the frequency offset of the correlation value $C_{T_{cp}}^{cp}$. The frequency offset is normalized to sub-carrier spacing and may be calculated by:

$$f_{ffo} = -\frac{\text{angle}(C_{T_{cp}}^{cp})}{2\pi} \qquad (\text{Eq. 15})$$

Figure 2C:
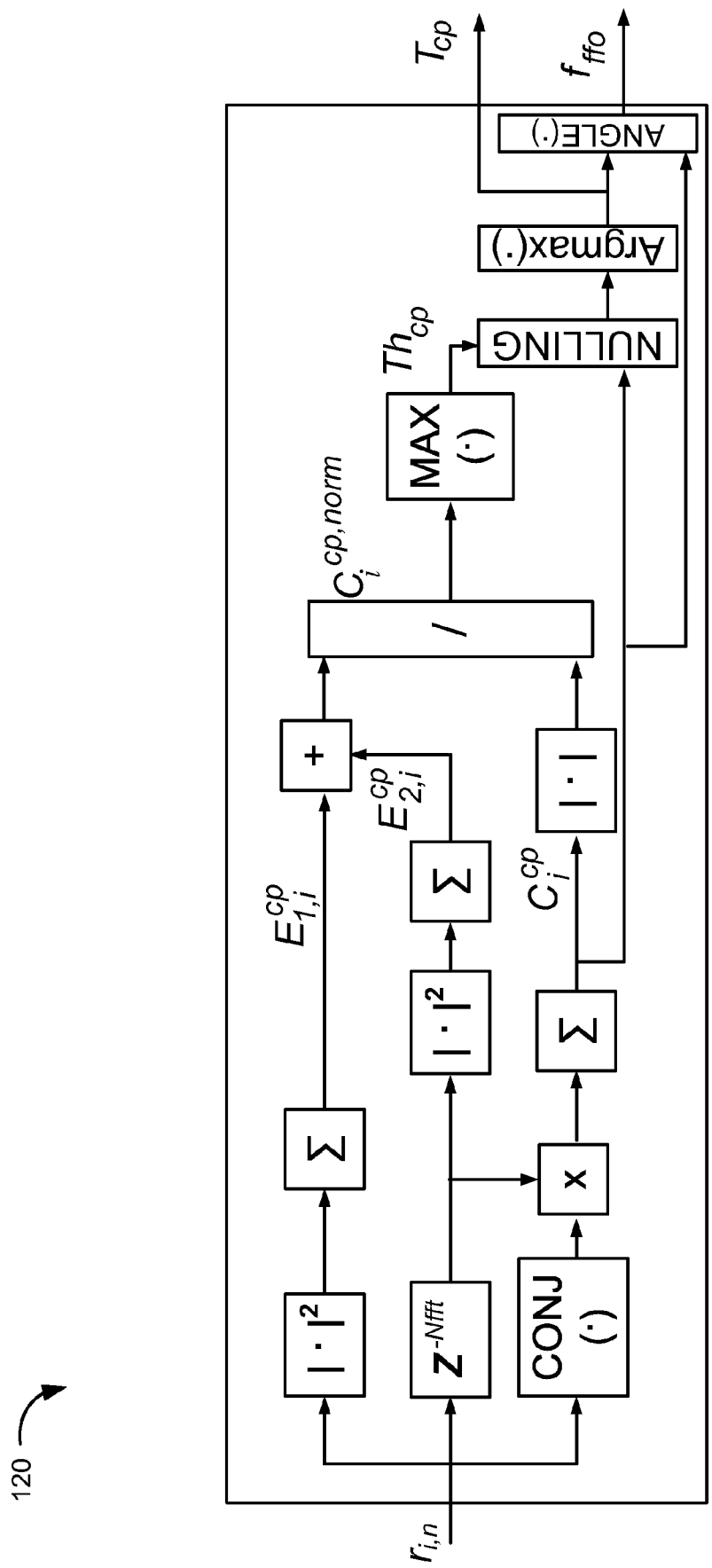
FIG. 2C illustrates an embodiment of the frequency offset estimation module depicted in FIG. 2A.

It should be noted that by combining normalized and non-normalized correlation methods as described above, the initial synchronization apparatus 100 is robust even in the presence of strong uplink interference. The coarse timing offset and fractional frequency offset derived utilizing the components discussed above can be compensated in either digital domain or analog domain. Preamble code detection may then be performed to estimate the integer frequency offset and the preamble index after which fine synchronization is performed by module 130. FIG. 2C illustrates an embodiment of the frequency offset estimation module 120 described above based on the various functions described in relation to the components within the coarse synchronizer 110.

The fine synchronizer 130 comprises a channel impulse response (CIR) estimation module 214. The CIR estimation module 214 is configured to obtain the time domain CIR based on the detected preamble symbol in the frequency domain. Frame and symbol boundaries are refined to meet demodulation requirements regarding timing precision by tracking the first path of the CIR. The preamble modulation of the received preamble symbol can be removed based on the following equation:

$$r_i' = \begin{cases} r_i^p \cdot l_i^p & \text{if } i \in \psi \\ 0 & \text{else} \end{cases} \qquad (\text{Eq. 16})$$

where $\{r^p\}$ represents the received preamble symbol in the frequency domain, $\{l^p\}$ represents the local preamble sequence which has the code index indicated by preamble code detection module, and where $\psi$ is the index set of preamble subcarriers.

The CIR estimation module 214 then performs an inverse fast Fourier transform (IFFT) on r' to obtain the time domain channel impulse response (CIR), represented by h, wherein:

$$h = \text{ifft}(r') \qquad (\text{Eq. 17})$$

The first path of the CIR is then derived. In accordance with some embodiments, the fine synchronizer 130 may further comprise a module 216 for identifying the "first" path associated with the received signals. In multi-path environment, there will be many peaks in the CIR where each peak corresponds to a particular path. The index of the first peak (or path) indicates timing position. In this regard, module 216 is configured to identify this first path in the time domain CIR derived by module 214. In accordance with exemplary embodiments, an energy detection method is deployed to identify the first path. First, the power of the CIR is calculated based on the following:

$$p_i = |h_i|^2 \qquad (\text{Eq. 18})$$

A threshold $Th_p$ is then applied to all $p_i$ to select valid paths. In particular, the selected paths may be expressed as:

$$p_m, m \in \{i | p_i \geq Th_p\} \qquad (\text{Eq. 19})$$

The threshold $Th_p$ may either be a predetermined constant or an adaptive value. For embodiments where an adaptive value is used, the threshold $Th_p$ may be calculated as:

$$Th_p = F_p \cdot \max_i(p_i) \quad \text{(Eq. 20)}$$

where $F_p$ is a constant less than or equal to 1. As a non-limiting example, $F_{cp}$ may be set to 0.2.

For each selected path, a window of size $L_m$ is defined such that:

$$W_m = \{p_m, p_{m+1}, \ldots, p_{m+L_m-1}\} \quad \text{(Eq. 21)}$$

The total energy of all paths within the window is then calculated:

$$p^{W_m} = \sum_{j=0}^{L_m-1} p_{m+j} \quad \text{(Eq. 22)}$$

The module 216 then identifies the path with the maximum energy window. The position of the identified path with the maximum energy window indicates the fine timing position $T_{fine}$ as determined based on:

$$T_{fine} \leftarrow \mathrm{argmax}_m(p^{W_m}) \quad \text{(Eq. 23)}$$

Figure 2D:
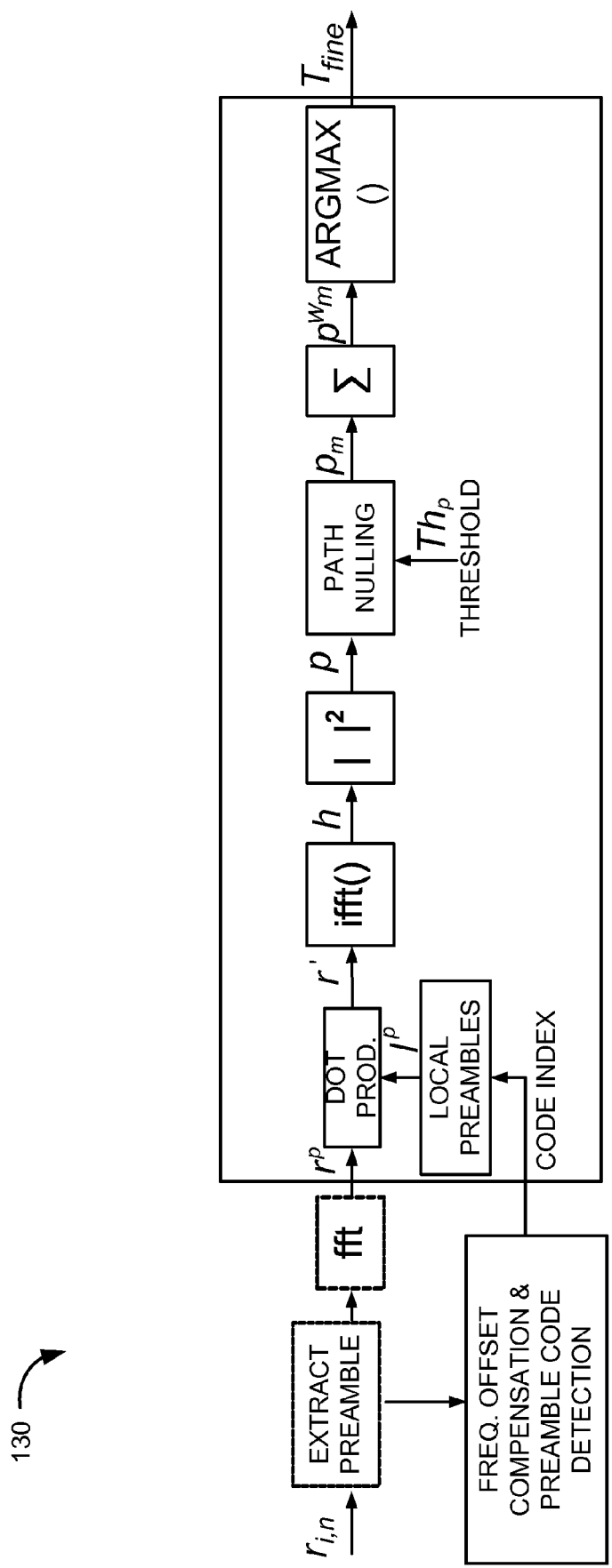
FIG. 2D illustrates an embodiment of the fine synchronization module depicted in FIG. 2A.

It should be noted that by using the channel impulse response (CIR) and energy detection methods, exact timing information can be derived with relatively low processing load. FIG. 2D illustrates an embodiment of the fine synchronizer 130 described above.

Figure 3:
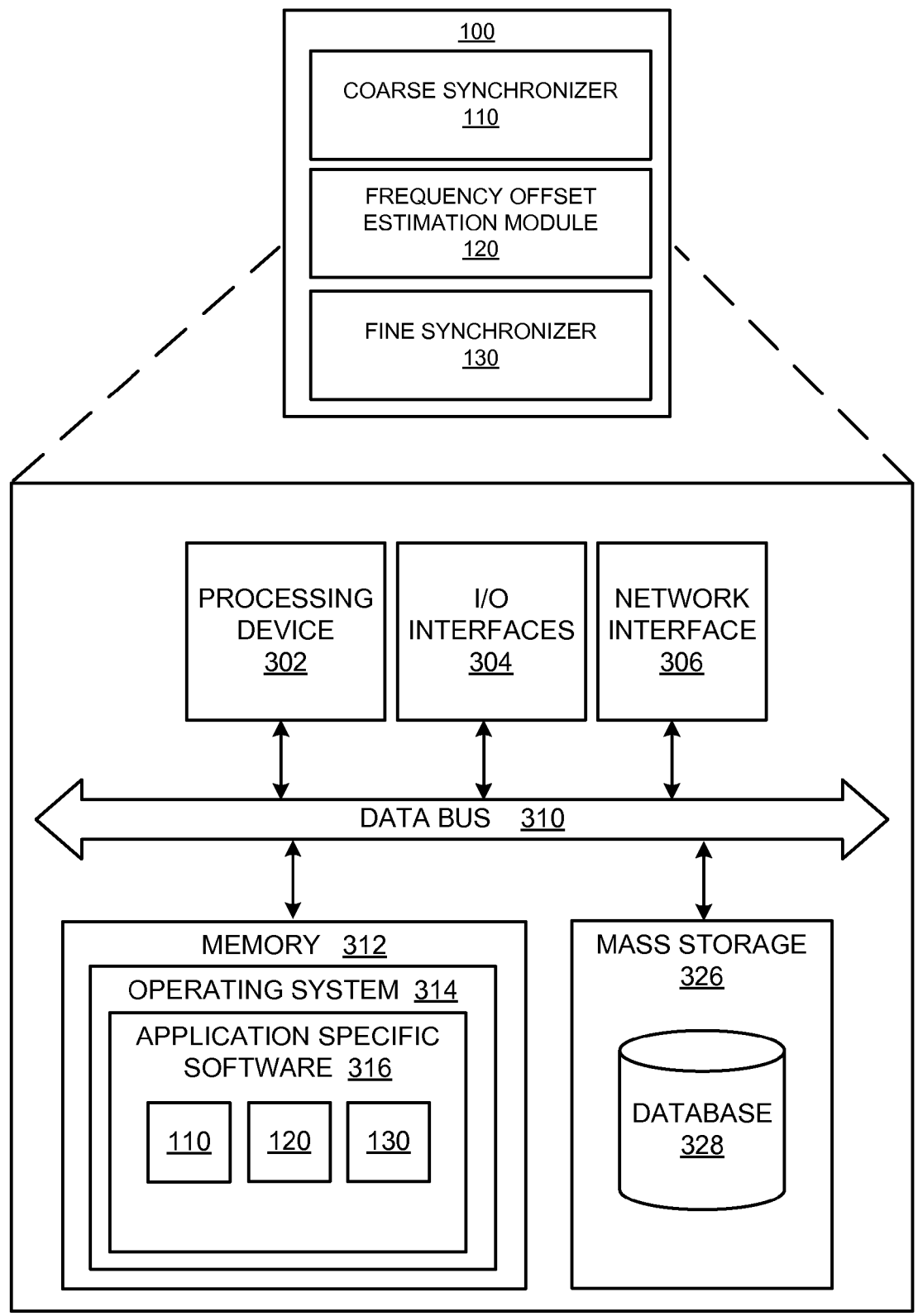
FIG. 3 illustrates an embodiment of the initial synchronization apparatus shown in FIGS. 1 and 2A-2D.

Reference is now made to FIG. 3, which illustrates an embodiment of the initial synchronization apparatus 100 shown in FIG. 1. Generally speaking, the initial synchronization apparatus 100 can comprise any one of a wide variety of computing devices. Irrespective of its specific arrangement, the initial synchronization apparatus 100 can, for instance, comprise memory 312, a processing device 302, a number of input/output interfaces 304, a network interface 306 (e.g., a wireless interface), and mass storage 326, wherein each of these devices is connected across a data bus 310.

Processing device 302 can include any custom made or commercially available processor, a central processing unit (CPU) or an auxiliary processor among several processors associated with the Initial synchronization apparatus 100, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316.

In accordance with some embodiments, the application specific software 316 may include the coarse synchronizer 110, frequency offset estimation module 120, and fine synchronizer 130, where the application specific software 316 is stored on a computer readable medium and is executed by the processing device 302. It should be emphasized that while the modules 110, 120, 130 may be implemented in software executable by the processing device 302, the modules 110, 120, 130 may also be implemented in hardware, firmware, or a combination of software, hardware, and firmware. One of ordinary skill in the art will appreciate that the memory 312 can, and typically will, comprise other components which have been omitted for purposes of brevity.

Input/output interfaces 304 provide any number of interfaces for the input and output of data. With further reference to FIG. 3, network interface device 306 comprises various components used to transmit and/or receive data over a network environment. The Initial synchronization apparatus 100 may further comprise mass storage 326. For some embodiments, the mass storage 326 may include a database 328.

Figure 4:
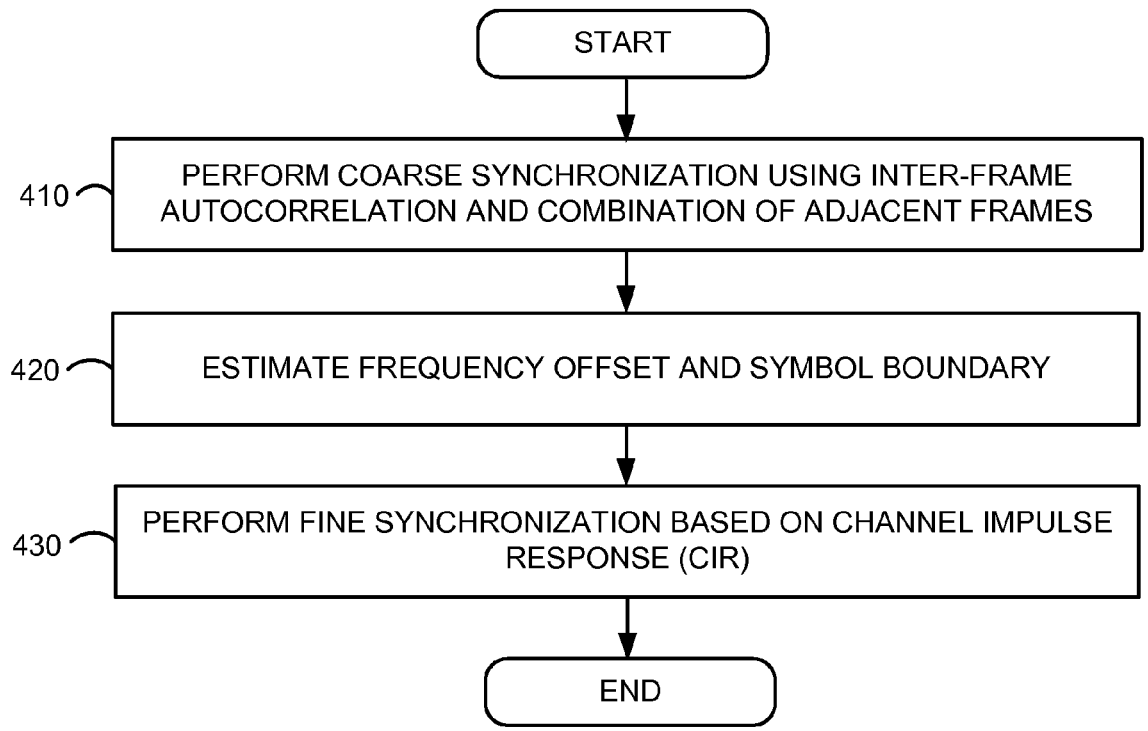
FIG. 4 is a flow diagram of an embodiment for performing initial synchronization utilizing the apparatus depicted in FIG. 1.

FIG. 4 is a flow diagram of an embodiment for performing initial synchronization utilizing the apparatus depicted in FIG. 1. In block 410, coarse synchronization is performed on received frames by performing inter-frame auto-correlation based on adjacent frames. In particular, approximate timing of a frame boundary associated with the received signal is determined. In accordance with some embodiments, coarse synchronization comprises downsampling the received signal and then performing inter-frame auto-correlation on frames within the downsampled received signal to obtain auto-correlation values. In addition, the computed auto-correlation values are normalized. Coarse synchronization further comprises detecting an edge of the received signal based on the normalized auto-correlation values. In block 420, the frequency offset and symbol boundaries are estimated. This comprises performing cyclic prefix (CP) auto-correlation on the received signal to determine symbol timing associated with the received signal. The frequency offset associated with the received signal is then determined based on the derived symbol timing.

In block 430, fine synchronization is performed based on the channel impulse response (CIR) of the received signal. In particular, a time domain channel impulse response (CIR) of the received signal is calculated. A search for the first peak within the CIR is then performed in order to derive fine timing information of the received signal. Determining a first peak within the CIR comprises identifying a peak within the CIR with the maximum energy. A predetermined threshold may be utilized to remove peaks associated with noise.

The methods or processes described above are not limited to the particular sequence of steps described. As one of ordinary skill in the art will appreciate, other sequences of steps may be possible, and the particular order of steps set forth herein should not be construed as limitations on the claims. One skilled in the art can readily appreciate that the sequences may be varied and still remain within the spirit and scope of the present invention.

It should also be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. An apparatus for performing initial synchronization in a wireless device comprising:
   a first synchronizer in the wireless device configured to determine approximate timing of a frame boundary for a received signal;
   a frequency offset estimator in the wireless device configured to estimate a frequency offset associated with symbol boundaries within the received signal; and
   a second synchronizer in the wireless device configured to determine precise timing information of the received signal, wherein the second synchronizer is configured to:
      calculate a time domain channel impulse response (CIR) of the received signal, wherein the second synchronizer includes a CIR estimator configured to determine a frequency domain preamble symbol of the received signal and perform an inverse fast Fourier transform (IFFT) on the frequency domain preamble symbol to derive the time domain CIR;
      identify a first peak in the calculated time domain CIR; and
      determine precise timing information by deriving a timing associated with the identified first peak in the calculated time domain CIR of the received signal.

2. The apparatus of claim 1, wherein the first synchronizer comprises:
   a module configured to downsample the received signal based on a predetermined sampling rate;
   a correlator configured to perform auto-correlation across adjacent frames within the downsampled received signal to obtain auto-correlation values;
   a combiner configured to combine multiple frame auto-correlation results; and
   an edge detector configured to derive timing information associated with the received signal based on the auto-correlation values.

3. The apparatus of claim 2, wherein the correlator is further configured to normalize the auto-correlation values.

4. The apparatus of claim 2, wherein the edge detector derives timing information by identifying a maximum value from among the auto-correlation values.

5. The apparatus of claim 1, wherein the frequency offset estimator comprises:
   a cyclic prefix (CP) correlator configured to obtain CP auto-correlation values associated the received signal to determine symbol timing associated with the received signal; and
   an estimator configured to determine a frequency offset associated with the received signal based on the determined symbol timing.

6. The apparatus of claim 5, wherein the correlator is further configured to normalize the auto-correlation values.

7. The apparatus of claim 6, wherein output from the CP correlator is filtered based on the normalized auto-correlation values to remove interference peaks for interference nulling.

8. The apparatus of claim 7, wherein the filtering is further based on an adaptive threshold.

9. The apparatus of claim 5, wherein the CP correlator determines symbol timing by identifying a maximum value from among the CP auto-correlation values.

10. The apparatus of claim 1, wherein the second synchronizer comprises:
    a path identifier configured to detect a first path associated with the time domain CIR based on a maximum energy associated with a path in a multipath environment.

11. The apparatus of claim 1, wherein to identify the first peak in the calculated CIR, the second synchronizer is further configured to:
    identify one or more peak power values in the calculated CIR;
    apply windows around the identified peak power values; and
    determine the window having a maximum energy, the window containing the identified first peak.

12. A method for performing frame synchronization comprising:
    performing a first synchronization to determine approximate timing of a frame boundary associated with a received signal;
    based on the approximate timing, estimating frequency offset and symbol boundaries within the frame boundary; and
    performing a second synchronization based on the frame boundary and the symbol boundaries, wherein performing a second synchronization comprises:
       calculating a time domain channel impulse response (CIR) based on a frequency domain preamble symbol of the received signal, wherein the second synchronization includes determining a frequency domain preamble symbol of the received signal and performing an inverse fast Fourier transform (IFFT) on the frequency domain preamble symbol to derive the time domain CIR;
       identifying a first peak in the calculated time domain CIR; and
       determining precise timing information by deriving a timing associated with the identified first peak in the calculated time domain CIR of the received signal.

13. The method of claim 12, wherein performing a first synchronization to determine approximate timing comprises:
    downsampling the received signal; and
    performing inter-frame auto-correlation on frames within the downsampled received signal to obtain auto-correlation values, wherein inter-frame auto-correlation is performed across adjacent frames within the received signal, and wherein performing inter-frame auto-correlation further comprises:
    normalizing the auto-correlation values; and
    combining normalized auto-correlation values over multiple frames.

14. The method of claim 13, further comprising detecting an edge of the received signal based on the normalized auto-correlation values.

15. The method of claim 12, wherein estimating frequency offset and symbol boundaries within the frame boundary comprises performing cyclic prefix (CP) auto-correlation on the received signal to determine symbol timing associated with the received signal.

16. The method of claim 15, further comprising:
    normalizing the auto-correlation values; and
    based on the normalized auto-correlation values, identifying correlation peaks caused by uplink interference and removing the identified correlation peaks.

17. The method of claim 15, further comprising determining a frequency offset associated with the received signal based on the determined symbol timing.

18. The method of claim 12, wherein determining a first peak within the CIR comprises identifying a peak within the CIR with a maximum energy.

19. The method of claim 12, wherein determining a first peak within the CIR further comprises utilizing a predetermined threshold to remove peaks associated with interference paths.

20. A system for performing frame synchronization comprising:
  means for performing a first-pass synchronization to determine approximate timing of a frame boundary associated with a received signal;
  means for estimating frequency offset and symbol boundaries within the frame boundary based on the approximate timing; and
  means for performing a second-pass synchronization based on the frame boundary and the symbol boundaries, wherein means for performing a second synchronization is further configured to:
    calculate a time domain channel impulse response (CIR) based on a frequency domain preamble symbol of the received signal, wherein the means for performing a second-pass synchronization includes means for determining a frequency domain preamble symbol of the received signal and means for performing an inverse fast Fourier transform (IFFT) on the frequency domain preamble symbol to derive the time domain CIR;
    identify a first peak in the calculated time-domain CIR; and
    determine precise timing information by deriving a timing associated with the identified first peak in the calculated time domain CIR of the received signal.

21. The system of claim 20, further comprising:
  means for downsampling the received signal;
  means for performing auto-correlation on a plurality of frames within the downsampled received signal to obtain auto-correlation values;
  means for normalizing the auto-correlation values;
  means for combining normalized auto-correlation values over multiple frames; and
  means for detecting an edge of the received signal based on normalized auto-correlation values.

22. The system of claim 20, further comprising:
  means for performing cyclic prefix (CP) auto-correlation on the received signal to determine symbol timing associated with the received signal;
  means for normalizing the auto-correlation values and performing interference nulling based on normalized auto-correlation values; and
  means for determining a frequency offset associated with the received signal based on the determined symbol timing.

* * * * *

UNITED STATES PATENT AND TRADEMARK OFFICE
CERTIFICATE OF CORRECTION

PATENT NO. : 8,446,894 B2  
APPLICATION NO. : 12/250012  
DATED : May 21, 2013  
INVENTOR(S) : Li

Page 1 of 1

It is certified that error appears in the above-identified patent and that said Letters Patent is hereby corrected as shown below:

On the Title Page, in Item (56), under "OTHER PUBLICATIONS", in Column 2, Line 6, delete "sytems,"" and insert -- systems," --, therefor.

In the Drawings

In Fig. 2A, Sheet 2 of 7, in Box "212", in Line 1, delete "FREQ." and insert -- FRACTIONAL FREQ. --, therefor.

Fig. 2D, Sheet 5 of 7, delete " $\lfloor |I|^2 \rfloor$ " and insert -- $\lfloor |I|^2 \rfloor$ --, therefor.

In the Specification

Column 4, Line 30, delete "$\{i,n\}$," and insert -- $\{r_{i,n}\}$, --, therefor.

Column 6, Lines 57-58, delete "frequency offset (FFO)" and insert -- fractional frequency offset (FFO) --, therefor.

Column 6, Lines 60-61, delete "frequency offset estimation 120" and insert -- frequency offset estimation module 120 --, therefor.

Signed and Sealed this  
Eleventh Day of March, 2014

Michelle K. Lee  
*Deputy Director of the United States Patent and Trademark Office*